US012772132B2

(12) United States Patent
Singh

(10) Patent No.: US 12,772,132 B2
(45) Date of Patent: Oct. 20, 2026

(54) COVERAGE ENHANCEMENT USING SELECTIVE UPLINK (UL) CARRIER AGGREGATION (CA)

(71) Applicant: T-Mobile USA, Inc., Bellevue, WA (US)

(72) Inventor: Jasinder Pal Singh, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 495 days.

(21) Appl. No.: 18/463,279

(22) Filed: Sep. 7, 2023

(65) Prior Publication Data

US 2025/0088930 A1 Mar. 13, 2025

(51) Int. Cl.
*H04W 36/20* (2009.01)
*H04B 17/336* (2015.01)

(52) U.S. Cl.
CPC .......... *H04W 36/20* (2013.01); *H04B 17/336* (2015.01)

(58) Field of Classification Search
CPC .... H04B 17/336; H04B 17/318; H04B 7/024; H04L 5/0073; H04W 36/0088; H04W 24/10; H04W 36/302; H04W 48/20; H04W 52/0209; H04W 52/243; H04W 52/367; H04W 52/241; H04W 52/283
USPC ................................ 370/328, 329, 330, 331
See application file for complete search history.

(56) References Cited

U.S. PATENT DOCUMENTS

| | | | | |
|---|---|---|---|---|
| 9,986,513 | B1 | 5/2018 | Liu et al. | |
| 2012/0270536 | A1 | 10/2012 | Ratasuk et al. | |
| 2014/0113644 | A1 * | 4/2014 | Burchardt ............ | H04L 5/0032 455/452.1 |
| 2014/0301252 | A1 * | 10/2014 | Choi .................... | H04L 5/0028 370/278 |
| 2016/0021677 | A1 * | 1/2016 | Wang .................... | H04W 16/24 370/235 |
| 2025/0088983 | A1 | 3/2025 | Singh | |

FOREIGN PATENT DOCUMENTS

| | | | | |
|---|---|---|---|---|
| JP | 2016532348 | A5 * | 10/2017 | |
| JP | 7142102 | B2 * | 9/2022 | ............ H04W 36/20 |
| WO | WO-2012155609 | A1 * | 11/2012 | ........ H04W 36/0072 |
| WO | WO-2014064569 | A2 * | 5/2014 | ........ H04W 52/0219 |
| WO | WO-2014113366 | A1 * | 7/2014 | ........ H04W 36/0094 |

* cited by examiner

*Primary Examiner* — David Q Nguyen
(74) *Attorney, Agent, or Firm* — Foley IP Law, PLLC

(57) ABSTRACT

Solutions are disclosed that employ selective uplink (UL) carrier aggregation (CA) to enhance coverage. Examples include: determining, by a wireless network, a status of a first user equipment (UE) indicating at least whether the first UE is roaming or is associated with a heavy user account; determining a signal to interference and noise ratio (SINR) for a cell of the wireless network; determining locations of UEs experiencing call failures within the cell; and based on at least the status of the first UE, the SINR for the cell, and locations of call failures within the cell, performing an interference reduction action comprising: forcing a handover of the first UE to a neighboring cell; or based on at least the first UE roaming or being associated with a heavy user account, restricting the first UE from using UL CA.

13 Claims, 8 Drawing Sheets

COVERAGE ENHANCEMENT USING SELECTIVE UPLINK (UL) CARRIER AGGREGATION (CA)

BACKGROUND

Carrier aggregation (CA) is a cellular communication scheme in which a user equipment (UE) connects to at least two different cells, a primary cell (p-cell) and also one or more secondary cells (s-cells). CA may be used for uplink (UL) and/or downlink (DL). When used for UL, the amount of interference experienced by UEs in the vicinity of the serving cells (e.g., a p-cell and s-cell(s)), caused by other UEs employing UL CA, increases. This increased interference reduces signal to interference and noise ratio (SINR) experienced by the serving cells and may reduce network throughput or coverage.

Network throughput is reduced when some UEs are forced to use lower data rate modulation schemes in order to maintain a required bit error rate (BER) for a give power level. UE transmit power for UL is typically the primary limitation for coverage in a cellular network. Coverage is reduced when the distance of a UE from a serving cell, coupled with the lower SINR and power transmission limits of the UE, prevents the serving cell from decoding transmissions from the UE, even with the lower rate modulation scheme. In such scenarios, UEs that are furthest from a cell (or otherwise provide the least received UL power) may be dropped, when the cell recognizes that it cannot maintain a sufficient SINR or BER.

SUMMARY

The following summary is provided to illustrate examples disclosed herein, but is not meant to limit all examples to any particular configuration or sequence of operations.

Solutions are disclosed that employ selective uplink (UL) carrier aggregation (CA) to enhance coverage. Examples include: determining, by a wireless network, a status of a first user equipment (UE) indicating at least whether the first UE is roaming or is associated with a heavy user account; determining a signal to interference and noise ratio (SINR) for a cell of the wireless network; determining locations of UEs experiencing call failures within the cell; and based on at least the status of the first UE, the SINR for the cell, and locations of call failures within the cell, performing an interference reduction action comprising: forcing a handover of the first UE to a neighboring cell; or based on at least the first UE roaming or being associated with a heavy user account, restricting the first UE from using UL CA.

Additional examples include: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, restricting the first UE from using a transmit power above a maximum transmit of power class (PC) three (PC3).

BRIEF DESCRIPTION OF THE DRAWINGS

The disclosed examples are described below with reference to the accompanying drawing figures listed below, wherein.

Figure 1:
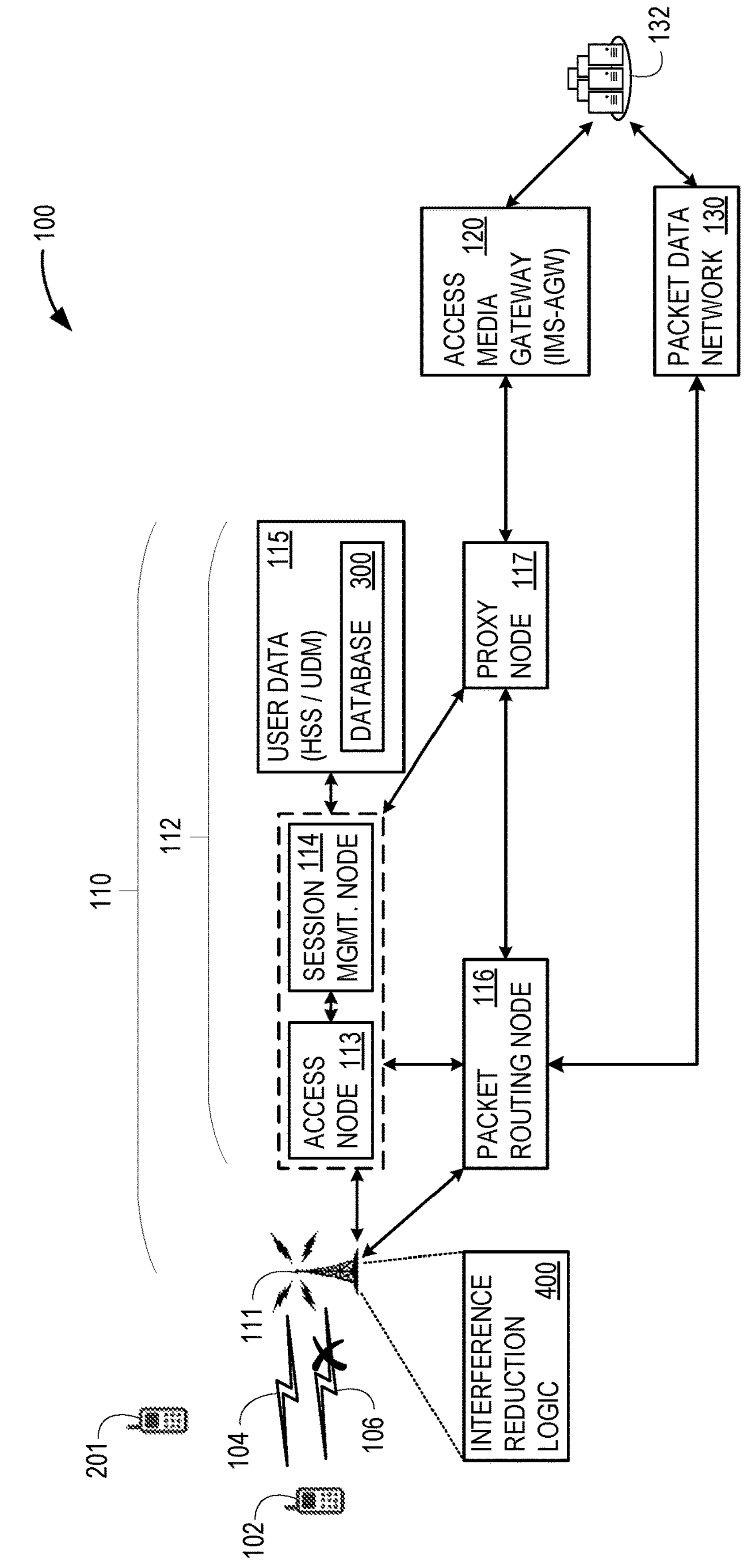
FIG. 1 illustrates an exemplary architecture that advantageously employ selective uplink (UL) carrier aggregation (CA) to enhance coverage.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that employ selective uplink (UL) carrier aggregation (CA) to enhance coverage. Examples include: determining, by a wireless network, a status of a first user equipment (UE) indicating at least whether the first UE is roaming or is associated with a heavy user account; determining a signal to interference and noise ratio (SINR) for a cell of the wireless network; determining locations of UEs experiencing call failures within the cell; and based on at least the status of the first UE, the SINR for the cell, and locations of call failures within the cell, performing an interference reduction action comprising: forcing a handover of the first UE to a neighboring cell; or based on at least the first UE roaming or being associated with a heavy user account, restricting the first UE from using UL CA.

Additional examples include: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, restricting the first UE from using a transmit power above a maximum transmit of power class (PC) three (PC3). A PC two (PC2) capable UE, which is a higher power classification UE than a PC3-only capable UE, typically has 3 decibels milliwatt (dBm) higher transmit power than a PC3 UE.

Aspects of the disclosure improve the coverage of cellular networks, by reducing UE-caused interference. The result is that, with improved cell coverage, fewer base stations are needed to serve a given number of users—or a larger number of users may be supported with the same level of resources. These advantageous results are accomplished, at least in part by, based on at least the status of a UE, a SINR for a cell, and locations of call failures within the cell, performing an interference reduction action. The interference reduction action, in various examples, comprises: forcing a handover of the first UE to a neighboring cell; based on at least the UE roaming or being associated with a heavy user account, restricting the UE from using UL CA, or restricting the UE from using a transmit power above a power restriction threshold that is below a maximum transmit power of the first UE.

With reference now to the figures, FIG. 1 illustrates an exemplary architecture 100 that enhances coverage for a cell 221 (shown FIG. 2), served by a base station 111 of a wireless network 110. In the scene depicted in FIG. 1, a UE 102 is using wireless network 110 to upload data to a network resource 132, and thus has a need for a relatively high uplink throughput. UE 102 may be a cellular telephone, such as a smartphone, but may also represent other telecommunication devices capable of using a wireless network, such as a personal computer (PC, e.g., desktop, notebook, tablet, etc.) with a cellular modem.

Wireless network 110 may be a cellular network such as a fifth-generation cellular technology (5G) network, a fourth-generation cellular technology (4G) network, or another cellular generation network. In normal cellular operation, UE 102 uses an air interface 104 to communicate with a base station 111 of wireless network 110. In some scenarios, base station 111 may also be referred to as a radio access network (RAN). Wireless network 110 has a core network 112 comprising an access node 113, a session management node 114, and a user database node 115. User database node 115 has a user account database 300, which is shown in further detail in FIG. 3. Wireless network 110 also has a packet routing node 116, and a proxy node 117, and a policy node 117.

Base station 111 is in communication with access node 113 and packet routing node 116. Access node 113 is in communication with session management node 114 and user database node 115. Packet routing node 116 is in communication with session management node 114, proxy node 117, and an external packet data network 130, such as the internet. In some 5G examples, base station 111 comprises a gNodeB (gNB), access node 113 comprises an access mobility function (AMF), session management node 114 comprises a session management function (SMF), user database node 115 comprises a home subscriber service (HSS) and/or a unified data management (UDM), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), user database node 115 comprises an HSS, and packet routing node 116 comprises an SAEGW-user plane (SAEGW-U). In some examples, proxy node 117 comprises a proxy call session control function (P-CSCF) in both 4G and 5G. In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

Proxy node 117 is in communication with an internet protocol (IP) multimedia system (IMS) access gateway (IMS-AGW) 120 within an IMS, in order to provide connectivity to other wireless (cellular) networks or a public switched telephone system (POTS). In some examples, proxy node 117 may be considered to be within the IMS. UE 102 reaches network resource 132 using either packet data network 130 or IMS-AGW 120. Data packets from UE 102 pass through at least base station 111 and packet routing node 116 on their way to external packet data network 130 or IMS-AGW 120 (via proxy node 117).

Figure 2:
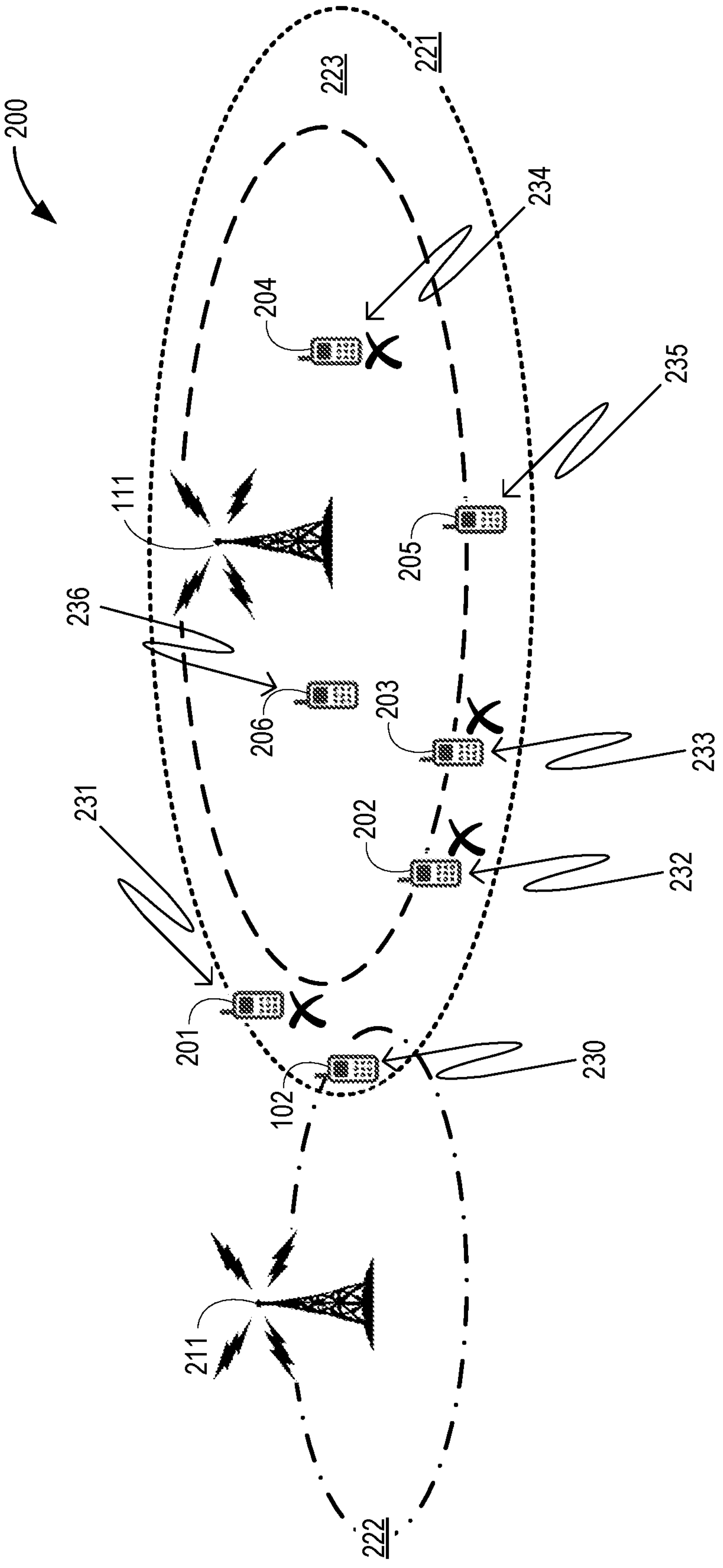
FIG. 2 illustrates an interference scenario, as may occur in examples of the architecture of FIG. 1.

Turning briefly to FIG. 2, locations of UEs that are experiencing call failures are shown in an interference scenario 200. Base station 111 provides a cell 221 (shown with the dotted line), and another base station 211 provides a neighboring cell 222 (shown with the dash-dot line). UE 102 is at a location 230 within range of both cells 221 and 222, so both cells 221 and 222 are available to UE 102. However, in the scenario shown in FIG. 2, cell 221 is the serving cell for UE 102.

Cell 221 has an edge region 223, shown between the concentric dashed and dotted lines. A UE 201 is at a location 231, a UE 202 is at a location 232, a UE 203 is at a location 233, a UE 204 is at a location 234, a UE 205 is at a location 235, and a UE 206 is at a location 236. UEs 102, 201, 202, 203, and 205 are within edge region 223. UEs 204 and 206 are further inside cell, and not within edge region 223. Edge region 223 may be defined according to criteria set based upon identifying where call failures are correlated with interference from other UEs, as opposed to some other cause. An example definition of edge region 223 is any radial distance from base station 111 that exceeds some threshold distance.

Four UEs (UEs 201, 202, 203, and 204) are experiencing call failures, as indicated by the nearby X-mark, and three of the four UEs experiencing call failures are within edge region 223. The call failures are occurring predominantly in edge region 223 of cell 221 because more than half of the UEs experiencing call failures are within edge region 223 (e.g., three of the four).

Because the call failures are occurring predominantly in edge region 223, one inference is that the call failures are interference-related. For example, UEs 102, 201, 202, 203, and 205 within edge region 223 are transmitting with relatively high power (for a UE), in order to reach base station 111 (i.e., so that base station 111 is able to decode transmissions from the UEs with an acceptable bit error rate, or BER). However, the interference experienced by UEs 102, 201, 202, 203, and 205 within edge region 223 may be caused by others of UEs 102, 201, 202, 203, and 205 within edge region 223. That is, because UEs 102, 201, 202, 203, and 205 are so distant from base station 111, they transmit at high power, causing interference that results in UEs 201, 202, 203 experiencing call failures. (UE 204 may be experiencing call failures for different reasons).

Base station 111 advantageously has the capability to address this issue. Returning to FIG. 1, base station 111 has interference reduction logic 400, which is shown in further detail in FIG. 4. In the scenario depicted in FIG. 1, UE 102 is requesting to use UL CA in order to increase its bandwidth for uploading data to network resource 132. The UL CA, if granted by wireless network 110, would use an air interface 106 on a different frequency than is used by air interface 104. However, as indicated by the X-mark, interference reduction logic 400 restricts UE 102 from using UL CA.

Alternatively, or in addition, UE 102 may be requesting to increase its transmit power, in order to use a higher-order modulation scheme that provides a higher data transmission rate. UE 102 may be a high power UE (HP UE), capable of PC2 transmit power. Although maximum power levels may be frequency dependent, in general, PC2-capable UEs are able to transmit with higher power than PC2-only UEs 3, such as 29 dBm versus 26 dBm. PC 1.5 (PC1.5) and PC one (PC1) are able to use even higher transmit power levels. Interference reduction logic 400 may also restrict UE 102 from using a transmit power above a power restriction threshold that is below a maximum transmit power of the first UE (e.g., restricting a PC2-capable UE to a PC3 power level).

Interference reduction logic 400 takes these actions, restricting the use of UL CA and/or restricting transmit power, in order to reduce interference produced by UE 102 that may negatively impact UEs 201-203—and possibly be causing or contributing to the call failures. Interference reduction logic 400 may treat different UEs differently, such as selectively restricting UL CA and/or restricting transmit power, based on the user account with which UE 102 is associated. That is, UE may or may not experience such restrictions, based on the type of user account associated with UE 102. In some examples, an interference reduction may be to force a handover of UE 102 to neighboring cell 222, because the handover may not only change the power UE 102 needs to transmit, but may also move UE 102 to a different frequency. Interference reduction logic 400 obtains relevant information from user account database 300.

Figure 3:
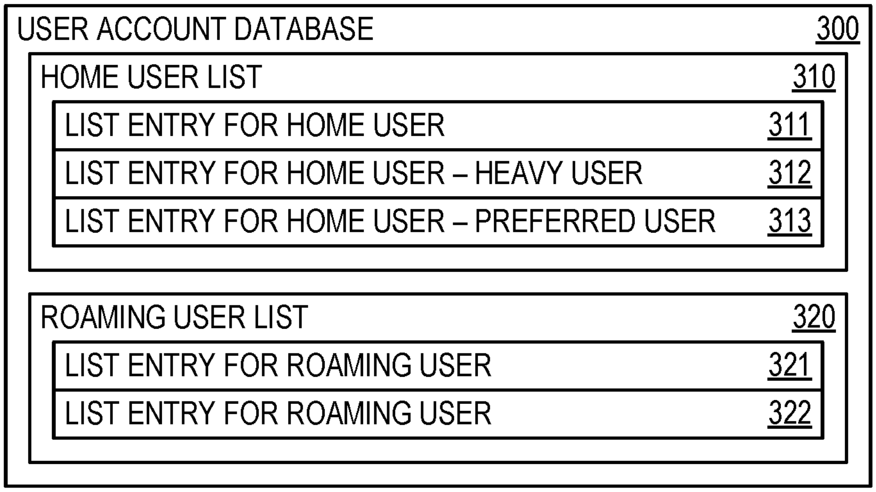
FIG. 3 illustrates further detail for user equipment (UE) account information that may be used within the architecture of FIG. 1.

FIG. 3 illustrates further detail for user account database 300. User account database 300 has a home user list 310, which identifies UEs and their corresponding (associated) user accounts that are home users for the operator of wireless network 110. User account database 300 also has a roaming user list 320, which identifies UEs that are not home users for the operator of wireless network 110, but are admitted onto wireless network 110 based on a roaming agreement with the roaming UE's home operator.

For home users, a user account may be normal user account, a heavy user account, a preferred user account, or another type. User account 311 is shown as a normal (typical) user account with no special annotations. User account 312 is shown as a heavy user account, which is a designation that may be reserved for the top 5% of the heaviest users, based on historical usage data. User account 313 is shown as a preferred user account, which may result in the associated UE receiving preferential treatment for allowance of UL CA and/or use of PC2 and higher transmit powers. User account 321 and user account 322 are shown as roaming users. Each of user accounts 311-313, 321, and 322 is a list entry in user account database 300, and each identifies the associated UE.

User database node 115, which hosts user account database 300, informs base station 111 of the type of account associated with each UE served by base station 111 (e.g., UEs 102 and 201-206). For example, user database node 115 informs base station 111 whether any of UEs 102 and 201-206 is a home user, a heavy user, a preferred user, or a roaming user. In some examples, core network 112 assigns a 5G quality of service (QoS) indicator (5QI) value of 9 (5QI9) to any UE associated with a heavy user account (e.g., any UE associated with heavy user account 312).

Figure 4:
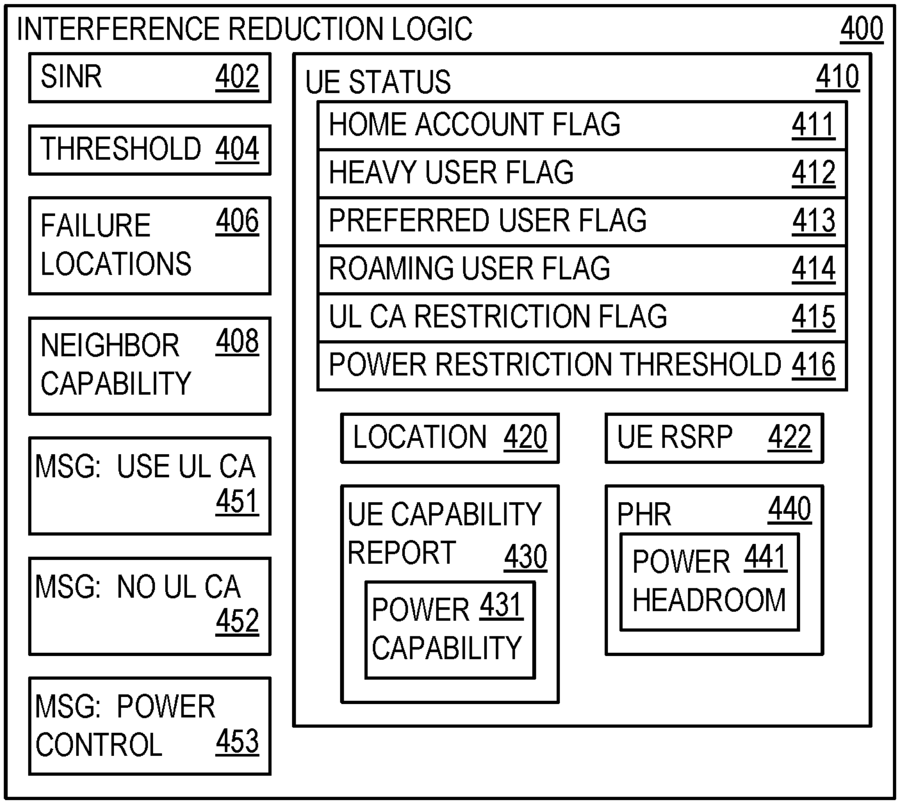
FIG. 4 illustrates factors that may be used for interference reduction in examples of the architecture of FIG. 1.

FIG. 4 illustrates further detail for interference reduction logic 400, which may be located within base station 111, or located elsewhere within wireless network 110. In some examples, the functionality described herein for interference reduction logic 400 is distributed among multiple locations within wireless network 110.

Interference reduction logic 400 holds a value for the SINR experienced by cell 221, as SINR 402. SINR 402 acts as a proxy for the SINR conditions experienced by UEs 102 and 206 being served by base station 111 in cell 221. SINR 402 may be based on a recent moving-average window, possibly weighted to emphasize most recent measurements. An SINR threshold 404 is used as a basis to determine whether interference reduction actions are needed. In some examples, there may be multiple SINR thresholds 404, and different degrees of aggressiveness for interference reduction actions are triggered based on how poor the SINR conditions are for cell 221.

Locations 406 tracks the locations of UEs that are experiencing call failures, such as location 231 for UE 201, location 232 for UE 202, location 233 for UE 203, and location 234 for UE 204. In some examples, locations 406 represents locations 231-234 as radial distance estimates from base station 111 (e.g., antennas of base station 111), rather than measured two-dimensional or three-dimensional locations. A radial distance estimate between a base station and a UE may be obtained efficiently using a UE's received signal parameter, such as a reference signal received power (RSRP) that is routinely reported to a base station by a UE, since transmitted signals over an air interface fall in power as a function of radial distance (among other factors). Locations 406 enables interference reduction logic 400 to determine whether call failures are occurring predominantly in edge region 223.

Neighboring base station capability 408 holds information regarding the capability of base station 211, such as whether base station 211 is capable of supporting UE 102 as a primary cell (p-cell) for UL CA. This information is relevant when, for example, UE 102 is associated with preferred user account 313, in order to minimize the likelihood that the handover will reduce the bandwidth available to a preferred user account.

Three common network messages are shown as within interference reduction logic 400, although in some examples, these messages may be generated elsewhere within wireless network 110. A message 451 instructs a receiving UE to use UL CA, a message 452 denies the receiving UE using UL CA, and message 453 instructs the receiving UE to limit its transmit power. In some examples, no message 452 exists, and instead wireless network 110 denies use of UL CA merely by never sending message 451. In some examples, message 453 is merely a normal power control message, and there are no messages mentioning PC3 or PC2 operation. Wireless network 110 may restrict UE 102 from using a transmit power above a maximum transmit power of PC3, by just using normal power control messaging, and just not sending any instruction to raise transmit power above 26 dBm.

A status 410 of UE 102 is a collection of information about UE 102 that is relevant to interference reduction decisions. Status 410 is a convention used herein to simplify the explanation of the operation of interference reduction logic 400. In some example, there is no clearly defined data file or directory holding all of the elements show for status 410.

A home account flag 411 represents information available to interference reduction logic 400 for determining that UE 102 is associated with a home user account, such as any of the user accounts in home user list 310. A heavy user account flag 412 represents information available to interference reduction logic 400 for determining that UE 102 is associated with heavy user account 312. In some examples, a 5QI9 assignment to channels used by UE 102 acts as heavy user account flag 412. A preferred user account flag 413 represents information available to interference reduction logic 400 for determining that UE 102 is associated with user account 313. A roaming account flag 414 represents information available to interference reduction logic 400 for determining that UE 102 is roaming, and is associated with any of the user accounts in roaming user list 320.

A UL CA restriction flag 415 indicates whether UE 102 is restricted from using UL CA. A power restriction threshold

416 indicates the maximum transmit power UE 102 is permitted to use, such as restricting UE 102 from using PC2 or higher transmit power. Location 420 represents location 230 of UE 102. In some examples, location 420 represents location 230 as a radial distance estimate from base station 111, similarly to locations 406 does for locations 231-234. As such, status 410 includes a received signal parameter 422 (e.g., RSRP) for UE 102. Received signal parameter 422 may be the most recent value, a time average of recent values, or represent a combination of values.

In addition to reporting its RSRP, UE 102 also sends a UE capability report 430 and a power headroom report (PHR) 440 to base station 111 on a regular basis. UE capability report 430 includes power capability 431 for UE 102, which indicates whether UE 102 is a PC3 UE, a PC2 UE, or another class of UE. In some examples, an HP UE is one that is capable of PC2 or higher transmit power. PHR 440 includes available power headroom 441. In some examples, rather than base station 111 transmitting an explicit instruction not to use PC2 capability, interference reduction logic 400 merely ignores any part of available power headroom 441 that is above PC3 transmit power (or another threshold), and does not permit UE 102 to go above power restriction threshold 416.

Figure 5:
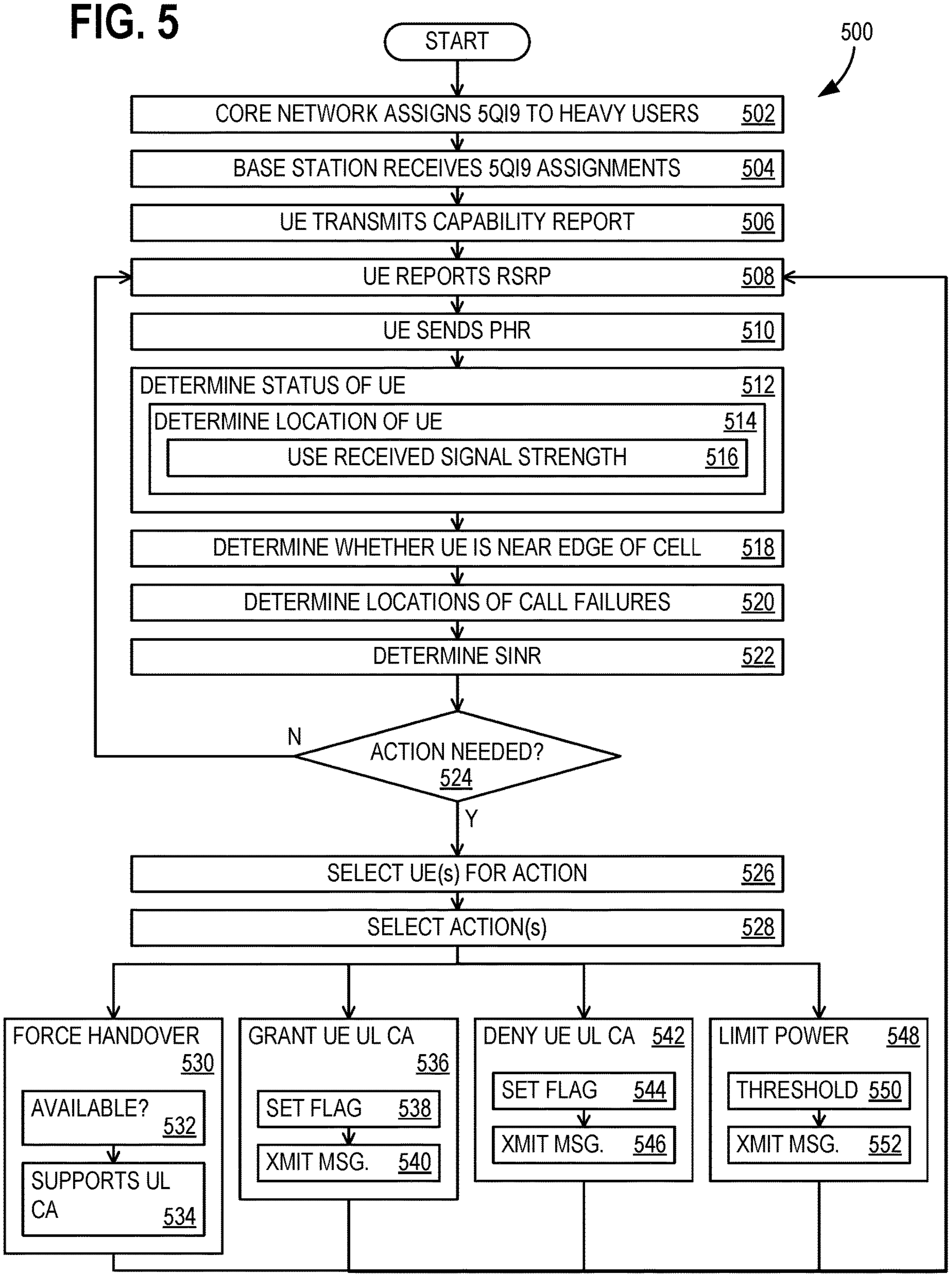
FIGS. 5, 6A, 6B, and 6C illustrate flowcharts of exemplary operations associated with the architecture of FIG. 1.

FIG. 5 illustrates a flowchart 500 of exemplary operations associated with architecture 100. FIG. 5 will be described with reference to the messages of FIGS. 3 and 4, where applicable. In some examples, at least a portion of flowchart 500 may be performed using one or more computing devices 700 of FIG. 7. Flowchart 500 commences with core network 112 determining whether UE 102 is associated with heavy user account 312, and if so, assigning 5QI9 to UE 102, in operation 502. In operation 504, core network 112 indicates to base station 111 that UE 102 is assigned 5QI9.

In operation 506, UE 102 transmits UE capability report 430 and base station 111 receives UE capability report 430 from UE 102. UE capability report 430 indicates whether UE 102 has PC2 capability (or another PC capability). Other UEs 201-206 also transmit their similarly-formatted UE capability reports to base station 111. In operation 508, base station 111 receives, from UE 102, received signal parameter 422, and also received signal parameters of other UEs 201-206. These include received signal parameters of each of UEs 201-204 experiencing call failures within cell 221.

Base station also receives PHR 440 from UE 102 in operation 510. In this described example for FIG. 5, PHR 440 report indicates that UE 102 has at least 3 dBm available power headroom, and UE capability report 430 indicates that UE 102 has PC2 capability. Base station also receives PHRs from other UEs 201-206. In operation 512, wireless network 110 (e.g., using interference reduction logic 400) determines status 410 of UE 102. Status 410 indicates at least whether UE 102 is roaming or is associated with heavy user account 312. In some examples, status 410 further indicates whether UE 102 is associated with preferred user account 313. Equivalents of status 410 are also collected or determined for other UEs 201-206.

Location 420 of UE 102 is determined in operation 514, along with locations of UEs 201-206, in operation 516. Locations of whichever of UEs 201-206, which are experiencing call failures (e.g., UEs 201-204), will be placed into locations 406. In some examples, determining a location of a UE comprises determining a received signal parameter (e.g., RSRP or another signal parameter related to received signal power), such as by averaging recent received measurements, and using that determined received signal parameter to estimate a radial distance from base station 111.

Location 420 of UE 102 enables interference reduction logic 400 to determine whether UE 102 is located within edge region 223 in operation 518 and also to determine whether locations 406 of UEs 201-204 experiencing call failures within cell 221 are within edge region 223, in operation 520. Operation 522 determines SINR 402.

Decision operation 524 determines whether an interference reduction action is warranted for cell 221, based on at least SINR 402 and locations 406 of call failures within cell 221. In some examples, decision operation 524 uses one or both of two criteria: (1) whether SINR 402 for cell 221 is below threshold 404, and (2) whether locations 406 of call failures within cell 221 are predominantly in edge region 223. If no an interference reduction action is warranted, flowchart 500 returns to operation 508, and continues looping until an interference reduction action is warranted.

When an interference reduction action is warranted, flowchart moves to operations 526-552 to select one or more UEs for an interference reduction action, select one or more interference actions, and performing the selected interference reduction action(s) on the selected UE(s). In some examples, performing an interference reduction action is based on at least SINR 402 being below threshold 404. In some examples, performing an interference reduction action is based on at least call failures occurring predominantly in edge region 223.

Operation 526 selects one or more of UEs 102 and 210-206 for interference reduction actions, based on at least status 410 and the status of other UEs 201-216 being served by cell 221. Operations 528, and selected ones of operations 530-552, are performed for each UE selected in operation 526. Flowchart 500 will be described for the scenario of operation 526 selecting UE 102.

Operation 528 selects one or more interference reduction actions, based on at least status 410, SINR 402, and locations 406. Worse (lower) SINR 402 and/or a higher count of call failures within cell 221 may result in a larger number of UEs selected for interference reduction actions, and/or more than just one interference reduction action being selected for a selected UE. The interference reduction action are shown in four parallel branches of flowchart 500, designated as operations 530, 536, 542, and 548.

Operation 530 is the branch of flowchart 500 that forces a handover of UE 102 to neighboring cell 222. Operation 530 may be selected based on at least UE 102 not roaming and not being associated with a heavy user account, or based on at least UE 102 being associated with a preferred user account. In some examples, operation 530 uses operations 532 and 534. Operation 532 determines that neighboring cell 222 is available to UE 102, and operation 534 determining that neighboring cell 222 supports UL CA.

Operation 536 is the branch of flowchart 500 that permits UE 102 to use UL CA. Operation 536 itself may not reduce interference, but the overall structure of flowchart 500, reaching operation 536 only for selected UEs—in contrast with permitting any UE to use UL CA-does provide interference reduction. For example, Operation 530 may be selected based on at least UE 102 not roaming and not being associated with heavy user account 312, and further (in some examples) based on at least location 420 of UE 102 being within edge region 223. In some examples, operation 536 uses operations 538 and/or 540. Operation 538 sets UL CA restriction flag 415 to indicate that UE 102 is permitted to use UL CA, and operation 540 transmits message 451 to UE 102 instructing UE 102 to use UL CA.

Operation 542 is the branch of flowchart 500 that restricts UE 102 from using UL CA, and may be based on at least UE 102 roaming or being associated with heavy user account 312. In some examples, operation 542 uses operations 544 and/or 548. Operation 544 sets UL CA restriction flag 415 to indicate that UE 102 is restricted from using UL CA, and operation 546 transmits message 452 to UE 102 denying UE 102 using UL CA.

Operation 548 is the branch of flowchart 500 that restricts UE 102 from using a transmit power above power restriction threshold 416, and may be selected based on at least UE 102 roaming or being associated with heavy user account 312. In some examples, power restriction threshold 416 is be 26 dBm (e.g., PC3) when UE 102 has a maximum transmit power of 29 dBm (PC2) or higher. Operation 550 sets power restriction threshold 416, and operation 552 transmits message 453 to UE 102 instructing UE 102 to limit its transmit power. After each of the selected operations 530, 536, 542, and/or 548, flowchart 500 returns to operation 508.

Figure 6A:
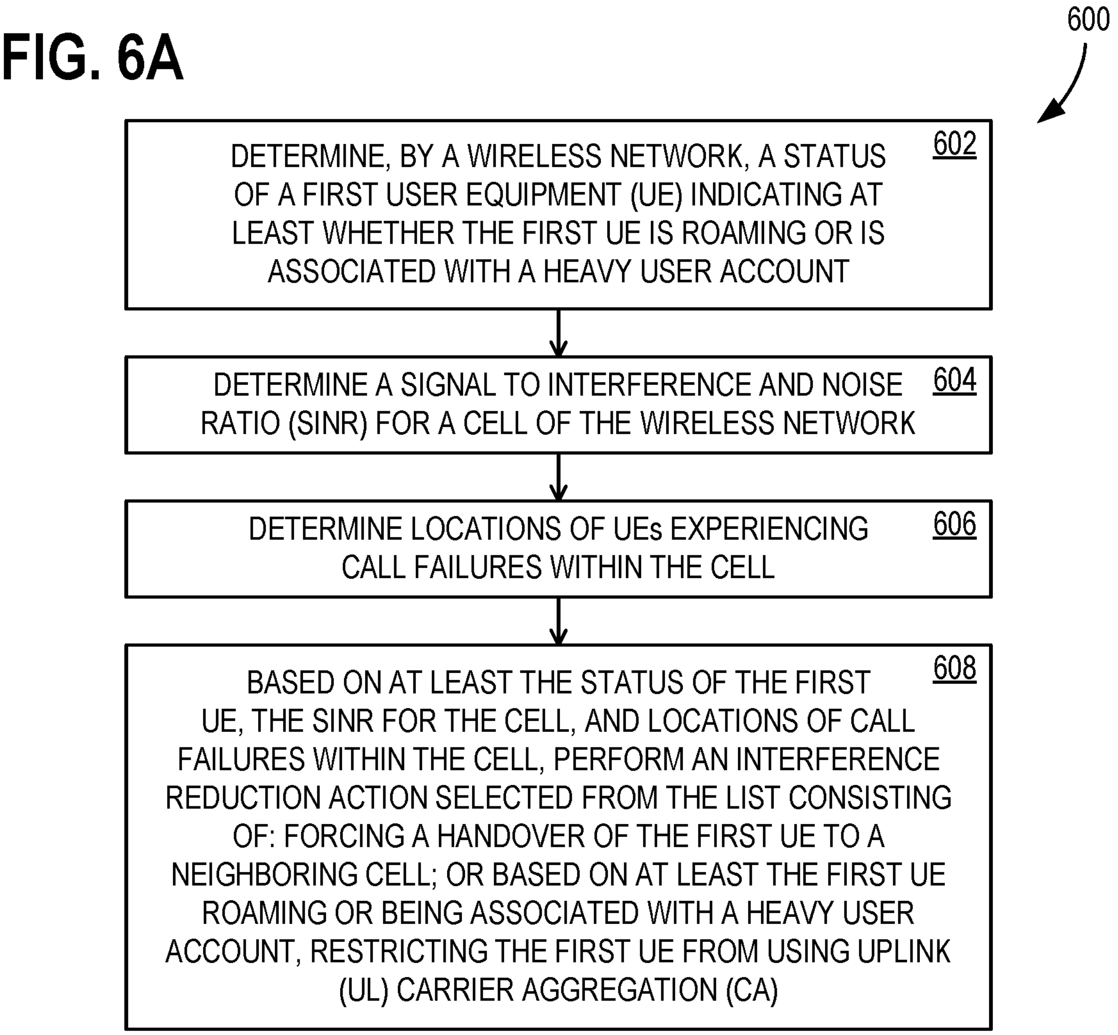

FIG. 6A illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes determining, by a wireless network, a status of a first UE indicating at least whether the first UE is roaming or is associated with a heavy user account.

Operation 604 includes determining a SINR for a cell of the wireless network. Operation 606 includes determining locations of UEs experiencing call failures within the cell. Operation 608 includes, based on at least the status of the first UE, the SINR for the cell, and locations of call failures within the cell, performing an interference reduction action comprising: forcing a handover of the first UE to a neighboring cell; or based on at least the first UE roaming or being associated with a heavy user account, restricting the first UE from using UL CA.

Figure 6B:
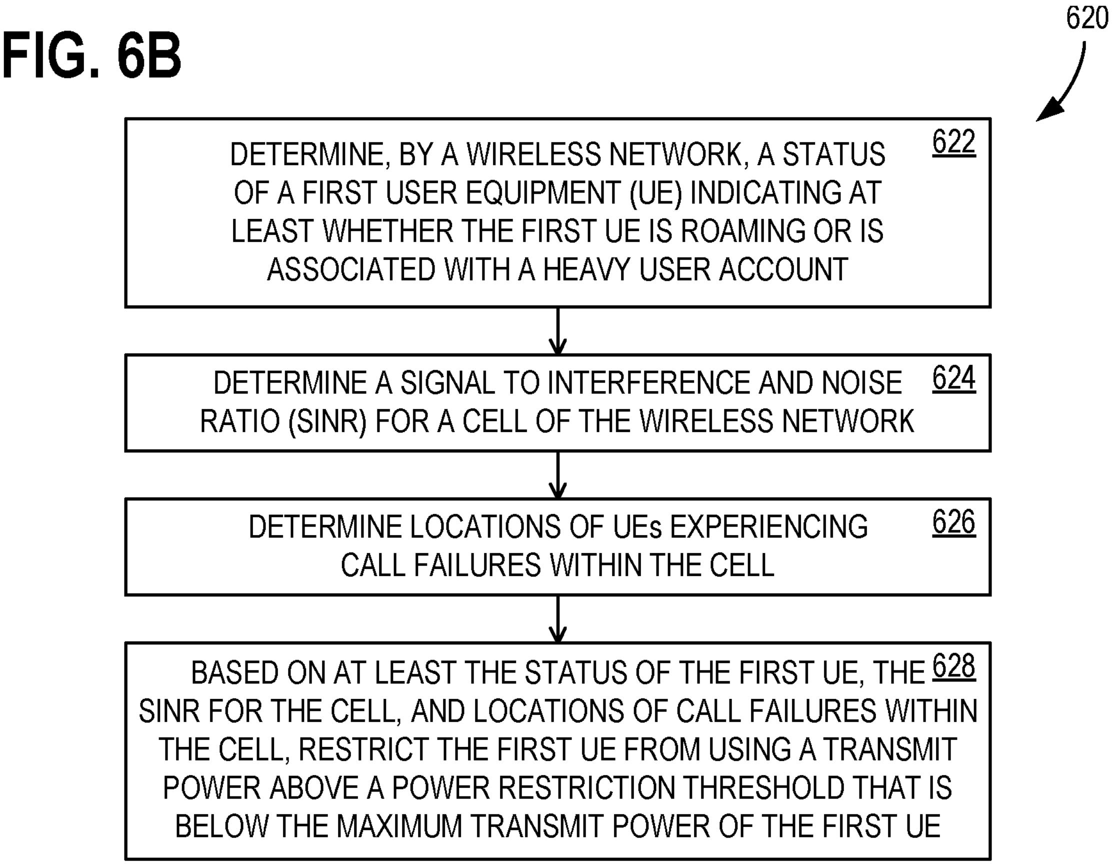

FIG. 6B illustrates a flowchart 620 of exemplary operations associated with examples of architecture 100. In some examples, at least a portion of flowchart 620 may be performed using one or more computing devices 700 of FIG. 7. Flowchart 620 commences with operation 622, which includes determining, by a wireless network, a status of a first UE indicating at least whether the first UE is roaming or is associated with a heavy user account.

Operation 624 includes determining a SINR for a cell of the wireless network. Operation 626 includes determining locations of UEs experiencing call failures within the cell. Operation 628 includes, based on at least the status of the first UE, the SINR for the cell, and locations of call failures within the cell, restricting the first UE from using a transmit power above a power restriction threshold that is below a maximum transmit power of the first UE.

Figure 6C:
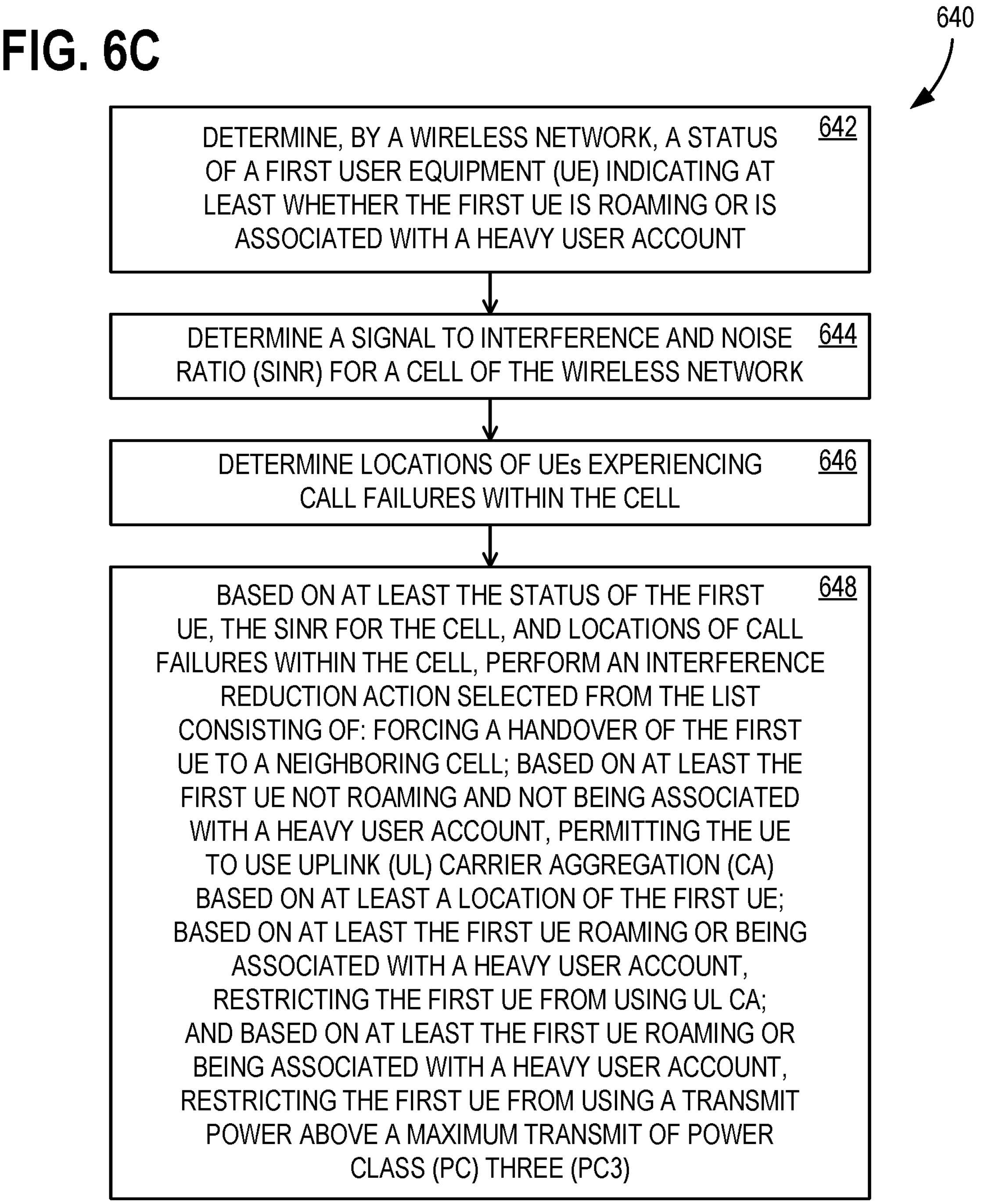

FIG. 6C illustrates a flowchart 640 of exemplary operations associated with examples of architecture 100. In some examples, at least a portion of flowchart 640 may be performed using one or more computing devices 700 of FIG. 7. Flowchart 640 commences with operation 642, which includes determining, by a wireless network, a status of a first UE indicating at least whether the first UE is roaming or is associated with a heavy user account.

Operation 644 includes determining a SINR for a cell of the wireless network. Operation 646 includes determining locations of UEs experiencing call failures within the cell. Operation 648 includes, based on at least the status of the first UE, the SINR for the cell, and locations of call failures within the cell, performing an interference reduction action selected from the list consisting of: forcing a handover of the first UE to a neighboring cell; based on at least the first UE not roaming and not being associated with a heavy user account, permitting the first UE to use UL CA based on at least a location of the first UE; based on at least the first UE roaming or being associated with a heavy user account, restricting the first UE from using UL CA; and based on at least the first UE roaming or being associated with a heavy user account, restricting the first UE from using a transmit power above a power restriction threshold that is below a maximum transmit power of the first UE.

Figure 7:
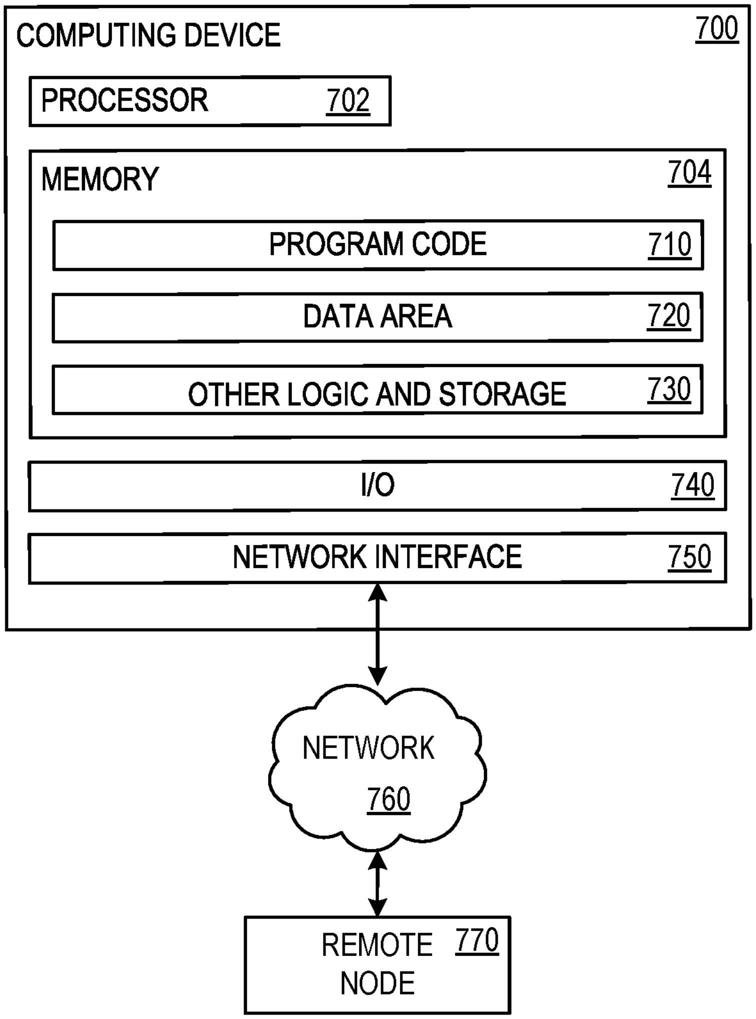
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

Additional Examples

An example system comprises: a processor; and a computer-readable medium storing instructions that are operative upon execution by the processor to: determine a status of a first UE indicating at least whether the first UE is roaming or is associated with a heavy user account; determine a SINR for a cell of the wireless network; determine locations of UEs experiencing call failures within the cell; and based on at least the status of the first UE, the SINR for the cell, and locations of call failures within the cell, perform an interference reduction action selected from the list consisting of: forcing a handover of the first UE to a neighboring cell; or based on at least the first UE roaming or being associated with a heavy user account, restricting the first UE from using UL CA.

An example method of wireless communication comprises: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, performing an interference reduction action selected from the list consisting of: forcing a handover of the first UE to a neighboring cell; or based on at least the first UE roaming or being associated with a heavy user account, restricting the first UE from using UL CA.

One or more example computer storage devices has computer-executable instructions stored thereon, which, upon execution by a computer, cause the computer to perform operations comprising: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, performing an interference reduction action selected from the list consisting of: forcing a handover of the first UE to a neighboring cell; or based on at least the first UE roaming or being associated with a heavy user account, restricting the first UE from using UL CA.

Another example system comprises: a processor; and a computer-readable medium storing instructions that are operative upon execution by the processor to: determine a status of a first UE indicating at least whether the first UE is roaming or is associated with a heavy user account; determine a SINR for a cell of the wireless network; determine locations of UEs experiencing call failures within the cell; and based on at least the status of the first UE, the SINR for the cell, and locations of call failures within the cell, restrict the first UE from using a transmit power above a power restriction threshold that is below a maximum transmit power of the first UE.

Another example method of wireless communication comprises: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, restricting the first UE from using a transmit power above a power restriction threshold that is below a maximum transmit power of the first UE.

One or more example computer storage devices has computer-executable instructions stored thereon, which, upon execution by a computer, cause the computer to perform operations comprising: determining, by a wireless network, a status of a first UE indicating at least whether the first UE is roaming or is associated with a heavy user account; determining a SINR for a cell of the wireless network; determining locations of UEs experiencing call failures within the cell; and based on at least the status of the first UE, the SINR for the cell, and locations of call failures within the cell, restricting the first UE from using a transmit power above a power restriction threshold that is below a maximum transmit power of the first UE.

Alternatively, or in addition to the other examples described herein, examples include any combination of the following:

- permitting the first UE to use UL CA comprises transmitting a message to the first UE instructing the first UE to use UL CA;
- permitting the first UE to use UL CA based on at least the location of the first UE comprises:
- determining that the first UE is located within an edge region of the cell;
- permitting the first UE to use UL CA based on at least the first UE being located within the edge region of the cell;
- restricting the first UE from using UL CA comprises transmitting a message to the first UE denying the first UE using UL CA;
- restricting the first UE from using a transmit power above the power restriction threshold that is below a maximum transmit power of the first UE comprises transmitting a message to the first UE instructing the first UE to limit power transmitted by the first UE;
- forcing the handover of the first UE to the neighboring cell comprises:
- determining that the neighboring cell is available to the first UE;
- based on at least the first UE not roaming and not being associated with a heavy user account, or based on at least the first UE being associated with a preferred user account, determining that the neighboring cell supports UL CA;
- based on at least the first UE not roaming and not being associated with a heavy user account, or based on at least the first UE being associated with a preferred user account, forcing the handover of the first UE to the neighboring cell based on at least the neighboring cell supports UL CA;
- determining whether the SINR for the cell is below a threshold, wherein performing the interference reduction action based on at least the SINR for the cell comprises performing the interference reduction action based on at least the SINR for the cell being below the threshold;
- determining whether call failures are occurring in an edge region of the cell, wherein performing the interference reduction action based on at least the locations of call failures within the cell comprises performing the interference reduction action based on at least the call failures occurring predominantly in the edge region of the cell;
- determining a location of a UE comprises determining a received signal parameter;
- the received signal parameter comprises RSRP;
- receiving, from the first UE, a received signal parameter of the first UE;
- receiving, from the UEs experiencing call failures within the cell, received signal parameters of each of the UEs experiencing call failures within the cell;
- receiving, from the first UE, a UE capability report indicating that the first UE has PC2 capability;
- receiving, from the first UE, a PHR indicating that the first UE has at least 3 dBm available power headroom;
- based on at least the user account associated with the first UE being a heavy user account, assigning 5QI9 to the first UE;
- indicating, by a core network of the wireless network, to a base station of the cell, that the first UE is assigned 5QI9;
- determining whether the first UE is associated with a preferred user account, wherein the status of the first UE further indicates whether the first UE is associated with the preferred user account;
- restricting the first UE from using UL CA comprises setting a flag indicating that the first UE is restricted from using UL CA;
- 5QI9 indicates that the first UE is associated with a heavy user account;
- The maximum transmit power of the first UE is a maximum transmit power of PC3;
- PC1 is a higher PC than PC2;
- PC3 is a lower PC than PC2;
- a maximum transmit power of PC3 is at least 3 dBm lower than a maximum transmit power of PC2 at a transmit frequency of the first UE;
- the maximum transmit power of PC2 a transmit frequency of the first UE is 29 dBm; and the maximum transmit power of PC3 a transmit frequency of the first UE is 26 dBm.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

determining, by a wireless network, a status of a user equipment (UE) indicating that the UE is roaming or associated with a heavy user account;

determining a signal to interference and noise ratio (SINR) for a cell of the wireless network;

determining locations of UEs experiencing call failures within the cell; and based on at least the status of the UE, the SINR for the cell, and the locations of UEs experiencing the call failures within the cell, performing an interference reduction action comprising:

based on at least the UE roaming or being associated with the heavy user account, restricting the UE from using uplink (UL) carrier aggregation (CA) by transmitting a message to the UE denying the UE from using the UL CA.

2. The method of claim 1, further comprising:

determining whether the SINR for the cell is below a threshold, wherein performing the interference reduction action based on at least the SINR for the cell comprises performing the interference reduction action based on at least the SINR for the cell being below the threshold.

3. The method of claim 1, further comprising:

determining whether call failures are occurring in an edge region of the cell, wherein performing the interference reduction action based on at least the locations of call failures within the cell comprises performing the interference reduction action based on at least the call failures occurring predominantly in the edge region of the cell.

4. The method of claim 1, wherein the status of the UE indicates that the UE is roaming and wherein the UE is restricted from using UL CA based on the UE roaming.

5. The method of claim 1, wherein the status of the UE indicates that the UE is associated with the heavy user account and wherein the UE is restricted from using UL CA based on the UE being associated with the heavy user account.

6. The method of claim 1, wherein the status of the UE indicates that the UE is both roaming and associated with the heavy user account and wherein the UE is restricted from using UL CA based on both the UE roaming and being associated with the heavy user account.

7. A method comprising:

determining, by a wireless network, a status of a user equipment (UE) indicating that the UE is neither roaming nor associated with a heavy user account;

determining a signal to interference and noise ratio (SINR) for a cell of the wireless network;

determining locations of UEs experiencing call failures within the cell; and based on at least the status of the UE, the SINR for the cell, and the locations of UEs experiencing the call failures within the cell, performing an interference reduction action comprising:

based on at least the status of the UE indicating that the UE is neither roaming nor associated with the heavy user account, permitting the UE to use uplink (UL) carrier aggregation (CA) based on at least a location of the UE by transmitting a message to the UE instructing the UE to use UL CA.

8. The method of claim 7, wherein permitting the UE to use UL CA based on at least the location of the UE further comprises:

determining that the UE is located within an edge region of the cell; and permitting the UE to use UL CA based on at least the first UE being located within the edge region of the cell.

9. The method of claim 7, further comprising:

determining whether the SINR for the cell is below a threshold, wherein performing the interference reduction action based on at least the SINR for the cell comprises performing the interference reduction action based on at least the SINR for the cell being below the threshold.

10. The method of claim 7, further comprising:

determining whether call failures are occurring in an edge region of the cell, wherein performing the interference reduction action based on at least the locations of call failures within the cell comprises performing the interference reduction action based on at least the call failures occurring predominantly in the edge region of the cell.

11. A method comprising:

determining, by a wireless network, a status of a user equipment (UE) indicating whether the UE is roaming or associated with a heavy user account;

determining a signal to interference and noise ratio (SINR) for a cell of the wireless network;

determining locations of UEs experiencing call failures within the cell; and based on at least the status of the UE, the SINR for the cell, and the locations of UEs experiencing the call failures within the cell, performing an interference reduction action that includes forcing a handover of the UE to a neighboring cell, wherein forcing the handover of the UE to the neighboring cell comprises:

determining that the neighboring cell is available to the UE; and based on at least the status of the UE indicating that the UE is neither roaming nor associated with the heavy user account or based on at least the UE being associated with a preferred user account:

determining that the neighboring cell supports UL CA; and forcing the handover of the UE to the neighboring cell based on at least the neighboring cell supporting UL CA.

12. The method of claim 11, further comprising:

determining whether the SINR for the cell is below a threshold, wherein performing the interference reduction action based on at least the SINR for the cell comprises performing the interference reduction action based on at least the SINR for the cell being below the threshold.

13. The method of claim 11, further comprising:

determining whether call failures are occurring in an edge region of the cell, wherein performing the interference reduction action based on at least the locations of call failures within the cell comprises performing the interference reduction action based on at least the call failures occurring predominantly in the edge region of the cell.

* * * * *